United States Patent [19]

Silvaggio et al.

[11] Patent Number: 4,816,710
[45] Date of Patent: Mar. 28, 1989

[54] FIELD ASSEMBLY INSULATOR

[75] Inventors: Joseph A. Silvaggio; Gerhard H. Dieroff, both of East Syracuse, N.Y.; James H. Bryant, Cheltenham, England

[73] Assignee: Prestolite Electric Incorporated, Toledo, Ohio

[21] Appl. No.: 147,259

[22] Filed: Jan. 22, 1988

[51] Int. Cl.$^4$ ...................... H02K 3/52; H02K 15/10
[52] U.S. Cl. ............................. 310/194; 310/42; 310/208
[58] Field of Search ............. 310/42, 43, 194, 208, 310/254, 258, 259, 269, 45

[56] References Cited

U.S. PATENT DOCUMENTS

| | | | |
|---|---|---|---|
| 941,456 | 11/1909 | Howell | 310/194 |
| 2,655,613 | 10/1953 | Wiesman | 310/208 |
| 3,129,348 | 4/1964 | Simmons | 310/208 |

FOREIGN PATENT DOCUMENTS 55-63538  5/1980  Japan .................. 310/269

Primary Examiner—Patrick R. Salce
Assistant Examiner—D. L. Rebsch
Attorney, Agent, or Firm—McAndrews, Held & Malloy, Ltd.

[57] ABSTRACT

A new and improved integral, flexible insulating member for a motor field assembly. The insulating member includes a curved back section to receive the motor pole piece through a centrally located opening. The insulating member further includes end and side sections extending from the opening to receive the motor winding, such that the end and side sections separate the winding and pole piece. The back section of the insulating member separates the winding and motor frame. The insulator is compressed about the winding to substantially avoid vibration thereof during operation.

10 Claims, 2 Drawing Sheets

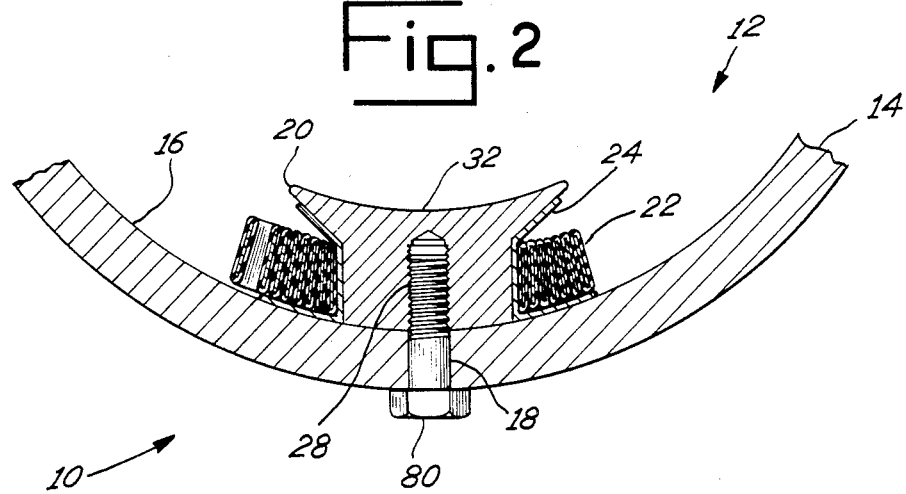
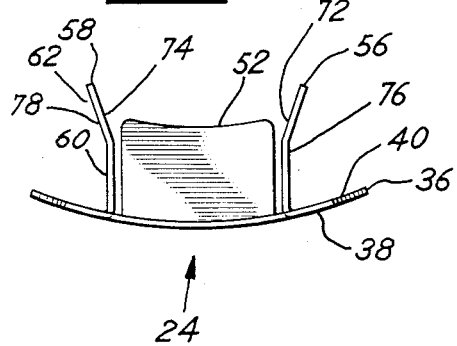
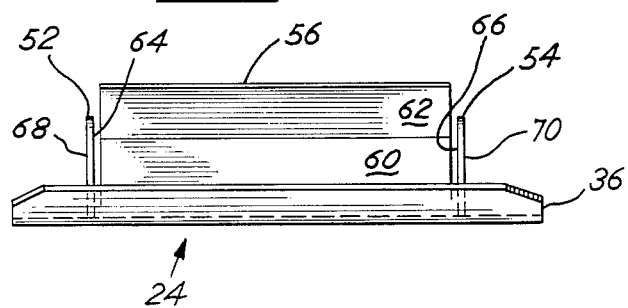

FIELD ASSEMBLY INSULATOR

BACKGROUND OF THE INVENTION

The present invention relates generally to a field assembly for a motor and more particularly to an integral flexible insulator for use in this type of field assembly.

As is well known in the art, a motor includes a series of field assemblies which cooperate in the rotation of the rotor. Each field assembly is rigidly attached to the motor frame which is usually cylindrical. The rotor is centrally located and driven about an axis substantially colinear with the axis of the motor frame.

Each field assembly includes a winding and pole piece or member. The winding substantially encompasses the pole piece so as to effectively produce flux therein.

In the past, field assemblies have been manufactured using a slow, labor-intensive process. The winding, usually machine-wound cooper wire, is wrapped with glass tape, in a half lap fashion, so as to insulate the winding from the pole piece and motor frame. Generally tape thickness is in the range of 0.005 to 0.015 inch.

The taped winding is then dipped in a varnish bath. Under wick action, the varnish passes through the glass tape in the hope that it will coat and bond together the wire forming the winding.

The winding is then fitted upon the pole piece and both are secured within the motor frame. In the assembled state, the winding is "pinched" or compressed between the pole piece and motor frame.

The pole piece is composed of metal laminations. The exterior surfaces thereof must be smooth to avoid snagging and tearing of the glass tape during the manufacturing process.

In other instances, insulating sheets such as nylon, mylar or laminations thereof, are inserted between the motor frame and field assembly during manufacture. These sheets further isolate the winding from motor frame.

The entire motor is then painted. This provides a protective coating.

SUMMARY OF THE INVENTION

In a principal aspect, the present invention is an improved field assembly for a motor. The present invention includes a pole pice, a pre-wound winding, and an integral flexible insulator adapted to insulate the winding within the field assembly and to secure the winding against vibration.

The insulator includes a back section adapted to conform to the cylindrical motor frame and defining a pole opening adapted to receive to the pole piece. It is through the pole opening that the pole member and thus the field assembly as a whole are attached to the motor frame.

The insulator further includes first and second end sections and first and second side sections, which extend from the back section about the pole opening. The end sections are opposed, as are the side sections.

The end sections and side sections are adapted to receive the pre-wonud winding for engagement with the back section. As such, the insulator physically isolates and insulates the winding from the pole piece and from the motor frame. The winding is also "pinched" within the insulator between the motor frame and pole member. This gripping action rigidly secures the winding against vibration which may lead to unwanted noise and deterioration of the insulator.

It is thus an object of the present invention to provide an improved field assembly for a motor. Another object is a new integral flexible insulator for use in a motor field assembly.

Still another object of the present invention is an improved field assembly including an integral flexible insulator wherein the winding is effectively insulated from the pole member and motor frame. An additional object is an integral flexible insulator for a field assembly wherein the winding is rigidly secured so as to avoid unwanted and potentially destructive vibration.

It is a further object to provide an improved field assembly including an integral flexible insulator which facilitates and simplifies the manufacturing process. Yet another object is a reliable, less expensive field assembly for a motor.

These and other features, objects and advantages of the present invention are described or apparent in the following description of a preferred embodiment.

BRIEF DESCRIPTION OF THE DRAWING

A preferred embodiment of the present invention is described herein with reference to the drawing wherein:

FIG. 2 is a partial horizontal cross-sectional view of the motor of FIG. 1, but shown in the assembled state;

FIG. 3 is an end view of the insulator of FIG. 1; and

FIG. 4 is a side view of the insulator of FIG. 3.

DETAILED DESCRIPTION OF A PREFERRED EMBODIMENT

Figure 1:
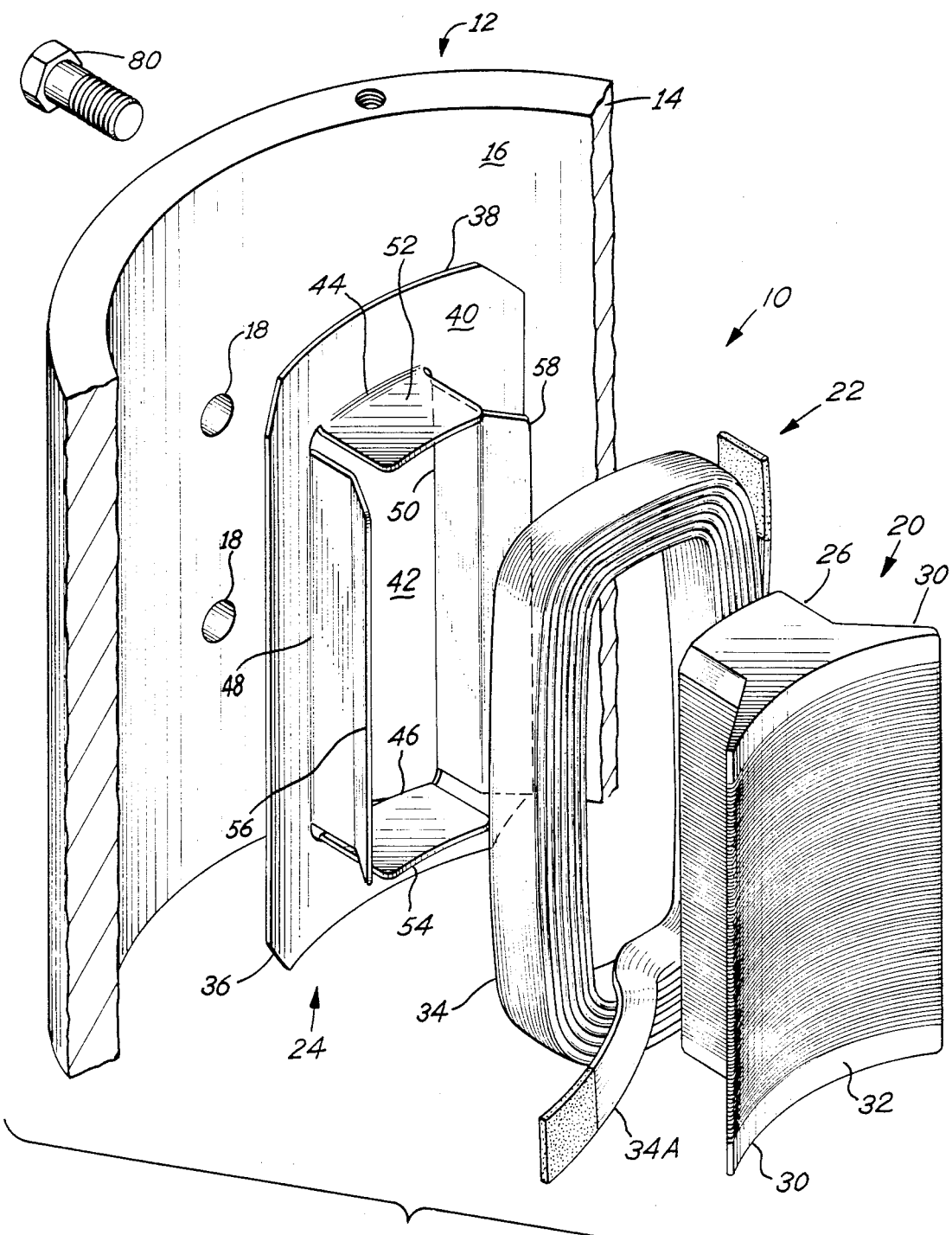
FIG. 1 is a partial exploded perspective view of a direct current motor illustrating the preferred embodiment and particularly the integral flexible insulator thereof.

A preferred embodiment of the present invention is shown in the drawing as an improved field assembly 10 for a direct current motor, generally designated 12. (The full features and operation of the motor 12 are well known and need not be included herein.) The motor 12 includes a substantially cylindrical motor frame 14 having an inner surface 16 and several pairs of attachment apertures 18 through which the field assembly 10 is rigidly attached. The motor 12 may be, by way of example, a traction or pump motor.

The field assembly 10 includes three principal components or elements—a pole piece or member 20, a winding 22, and an integral flexible insulator 24. The pole piece 20 is conventional in nature and design. The pole piece 20 includes a substantially rectangular base segment 26 which has two internally threaded apertures 28 therein. Opposite the apertures 28, the pole piece 20 includes two tapered pole tips 30 which extend longitudinally along the base segment 26. The base segment 26 and tapered pole tips 30 cooperate to define a smoothly curved pole face 32. The pole piece 20 is constructed of metal laminations, as best shown in FIG. 1.

The winding 22 is machine-wound copper wire 34 and has a substantially rectangular, slightly curved configuration. A preferred wire 34 is the Armored Poly-Thermaleze 2000, marketed by the Phelps Dodge Magnet Wire Company (Fort Wayne, Ind.), which is rectangular in cross section. The wire 34 may also be circular in cross section. As is known in the art, the wire 34 includes an insulating overcoat 34A, which is removed for interconnection of windings 22 within the motor 12. The four legs of the winding 22 are preferably wrapped for stability.

The insulator 24 is a high temperature thermoplastic, such as "Victrex 4800G" marketed by Empirical Chemical Industries (Welwyn, England). This plastic is a polyethersulphone which provides sufficient temperature resistance, dielectric strength and flexibility.

The insulator 24 includes a curved, substantially rectangular back section 36 having outer back wall 38 and an inner back wall 40. The back section 36 and more particularly the outer back wall 38 are designed to engage and conform to the inner surface 16 of the motor frame 14. As shown, the effective radius of the outer back wall 38 is greater than that of the inner surface 16, such that the insulator 24 must be forced to engage and conform.

As best shown in FIG. 1, the back section 36 of the insulator 24 defines a centrally located, substantially rectangular pole opening 42, having opposed end boundaries 44, 46 and opposed side boundaries 48, 50. For a 6.6 inch outer diameter motor frame 14, the length of the back section 36 is 6.15 inches; the width thereof is 3.56 inches; the length of the pole opening 42 is 4.15 inches; and the width of the pole opening 42 is 1.3 inches. The insulator 24 has a thickness in the range of 0.025 to 0.040 inch.

The insulator 24 further includes first and second end sections 52, 54 and first and second side sections 56, 58. As shown, the first and second end sections 52, 54 extend from the base section 36 along the first and second opposed end boundaries 44, 46, respectively, of the pole opening 42. The first and second end sections 52, 54 are preferably substantially perpendicular to the back section 36 and have a width of 0.7 inch in the above-cited motor size.

The first and second side sections 56, 58 extend from the first and second opposed side boundaries 48, 50. Each of the side sections 56, 58 preferably includes a first portion 60 extending substantially perpendicular to the back section 36 and an outwardly extending second portion 62. The angle between the first and second portions 60, 62 is preferably in the range of 5 to 20 degrees. The overall width of the first and second side sections 56, 58 is 0.99 inch in the above-cited motor size—the first portion 60 being 0.45 inch.

The first and second end sections 52, 54 include inner end walls 64, 66 and outer end walls 68, 70 respectively. The first and second side sections 56, 58 include inner side walls 72, 74 and outer side walls 76, 78 respectively.

During assembly, the side sections 56, 58 are flexed such that the winding 22 may be slipped onto the insulator 24. The winding 22 thus engages the inner back wall 40 of the back section 36 and the outer side walls 76, 78 of the side sections 56, 58, respectively.

The insulator 24 is then slipped onto the base segment 26 of the pole piece 20 and the threaded apertures 28 are aligned with the attachment apertures 18. Hex-head screws 80 are added to secure the field assembly 10 to the motor frame 14.

Tightening of the screws 80 draws the tapered pole tips 30 of the pole piece 20 into contact with the inner side walls 72, 74 of the side sections 56, 58 of the insulator 24. Further tightening "pinches" the winding 22 between the back section 36 and side sections 56, 58 of the insulator 24, without contact between the motor frame 14 or the pole piece 20 and the winding 22. Compression of the insulator 24 in this fashion grips and rigidly secures the winding 22 with respect to the motor frame 14 and pole piece 20 so as to substantially reduce vibration and the deleterious effects thereof.

The winding 22 is physically isolated by the insulator 24. In particular, the winding 22 is isolated and insulated from the motor frame 14 by the back section 36 and from the pole piece 20 by the end sections 52, 54 and side sections 56, 58. The winding 22 is also partially encompassed by the end sections 52, 54 and side sections 56, 58.

The fully assembled motor 12, including the motor frame 14 and field assemblies 10, is next flooded with varnish (not shown) which impregnates the entire motor 12. The varnish (i) provides a protective finish, (ii) further bonds together the wire 34 within each winding 22, (iii) further secures the winding 22 to the motor frame 14, pole piece 20 and insulator 24, and (iv) further affixes and bonds each field assembly 10 to the motor frame 14.

The advantages of the present invention are numerous and result in a less expensive, more reliable motor 12. First and foremost, the present invention provides a more rigid securing of the winding 22 with respect to the motor frame 14 and pole piece 20. The resulting decrease in winding movement and vibration substantially reduces operational noise, particularly when the motor 12 is electronically controlled, and substantially increases motor life. In the past, vibration of the winding 22 not only produced unwanted noise but caused the insulating glass tape to wear away. Contact between the pole piece 20 and winding 22, in turn, caused motor failure.

Second, the half lap covering the winding 22 with glass tape is eliminated. The tape is (i) expensive, (ii) presently available from only one source, and (iii) costly to apply. It also tends to fray requiring extensive care; indeed the glass tape must often be dipped in varnish, prior to application to the winding 22, to reduce fraying. Equally important, the glass tape can irritate the skin requiring the use of gloves and masks.

Third, the present invention improves heat transfer within the motor 12. Without the half lapped glass tape, the field assembly 10 operates at a lower temperature in a given environment, which increases motor efficiency and expected life. Fourth, with elimination of the glass tape, it is no longer necessary to manufacture pole pieces 18 with smooth surfaces, again reducing the cost of the motor 12. Finally, dipping of the entire motor 12 in varnish eliminates the need for painting.

A preferred embodiment of the present invention has been described. It is to be understood, however, that changes and modifications may be made without departing from the true scope and spirit of the present invention, which are defined by the following claims.

What is claimed is:

1. An improved integral flexible insulator for use in a field assembly of a motor having a generally cylindrical motor frame, said field assembly including a winding having a central opening therein and a pole piece, with one portion of said pole piece being extendable through the central opening of said winding so that said winding may be disposed between another portion of said pole piece and the radially inwardly facing surface of said motor frame when said field assembly is attached to said motor frame, said insulator comprising:

a back section having an inner back wall that may engage and conform to the radially inwardly facing surface of said motor frame when said insulator is attached to the motor frame, said back section also including first and second opposed end boundaries and first and second opposed side boundaries that define a substantially central pole opening in the inner back wall of the back section that may receive the one portion of said pole piece such that the one portion of said pole piece may be attached to the inwardly facing surface of said motor frame;

first and second end sections that are integral parts of the back section and that extend generally radially inwardly from said first and second opposed end boundaries of said back section;

first and second side sections that are integral parts of the back section and taht extend generally radially inwardly from said first and second opposed side boundaries of said back section;

said first and second end sections and said first and second side sections being adapted to be received within the central opening of said winding such that said winding engages said inner back wall of said back section and portions of the first and second side sections when said field assembly is attached to said motor frame whereby said integral flexible insulator physically isolates and insulates said winding from said motor frame and said pole piece and said winding is partially encompassed and gripped by said insulator.

2. An integral flexible insulator as claimed in claim 1 wherein said pole piece engages portions of said first and second side seetions spaced radially inwardly from said back section; and wherein said back section is curved.

3. An integral flexible insulator as claimed in claim 1 wherein said pole opening is substantially rectangular.

4. An integral flexible insulator as claimed in claim 1 or 2 wherein the effective radius of the inner back wall of the back section is greater than that of the radially inwardly facing surface of said motor frame.

5. An integral flexible insulator as claimed in claim 4 where each of said first and second side sections includes a first portion extending substantially perpendicular to said back section and a second portion extending from said first portion at a predetermined angle.

6. An improved motor field assembly for attachment to a generally cylindrical motor frame;
a pole piece including a base and tapered pole tips extending from said base so that the pole tips define a pole face that faces generally radially inwardly;
a pre-wound winding having a central opening therein;
an integral flexible insulator including (i) a back section, defining an inner back wall, that engages and conforms to the radially inwardly facing surface of said motor frame, said back section including first and second opposed end boundaries and first and second opposed side boundaries defining a substantially central pole opening that receives said base of said pole piece such that said pole piece extends through the central pole opening so as to be attachable to said motor frame, (ii) first and second end sections that are integral parts of said back section and that extend generally radially inwardly from said first and second opposed end boundaries of said back section, and (iii) first and second side sections that are integral parts of said section and that extend generally radially inwardly from said first and second opposed side boundaries of said back section;

said first and second end sections and said first and second side sections being received within the central opening of said pre-wound winding such that said pre-wound winding engages said inner back wall of said back section and such that the first and second end sections and the first and second side sections are interposed between said pre-wound winding and said pole piece;

said tapered pole tips of said pole piece engaging said first and second side sections so as to compress said pre-wound winding between said first and second side sections and said inner back wall of said back section so that said integral flexible insulator grips said pre-wound winding so as to substantially avoid vibration thereof, said integral flexible insulator also serving to dielectrically isolate said pre-wound winding from said motor frame and to isolate said pole piece from said pre-wound winding.

7. A field assembly as claimed in claim 6 wherein said back section of said integral flexible insulator is curved such that the effective radius of the inner back wall of the back section is greater than that of the radially inwardly facing surface of said motor frame.

8. A field assembly as claimed in claim 7 wherein each of said first and second side sections includes a first portion extending substantially perpendicular to said back section and a second portion extending from said first portion at a predetermined angle.

9. A field assembly as claimed in claims 1 or 6 wherein said integral flexible insulator is a high temperature thermoplastic.

10. A field assembly as claimed in claim 6 or 8 further including a varnish bond coating.

* * * * *